Jan. 15, 1935.　　　F. O. PARKER　　　1,988,136
SUPPORTING BRACKET
Filed June 6, 1933
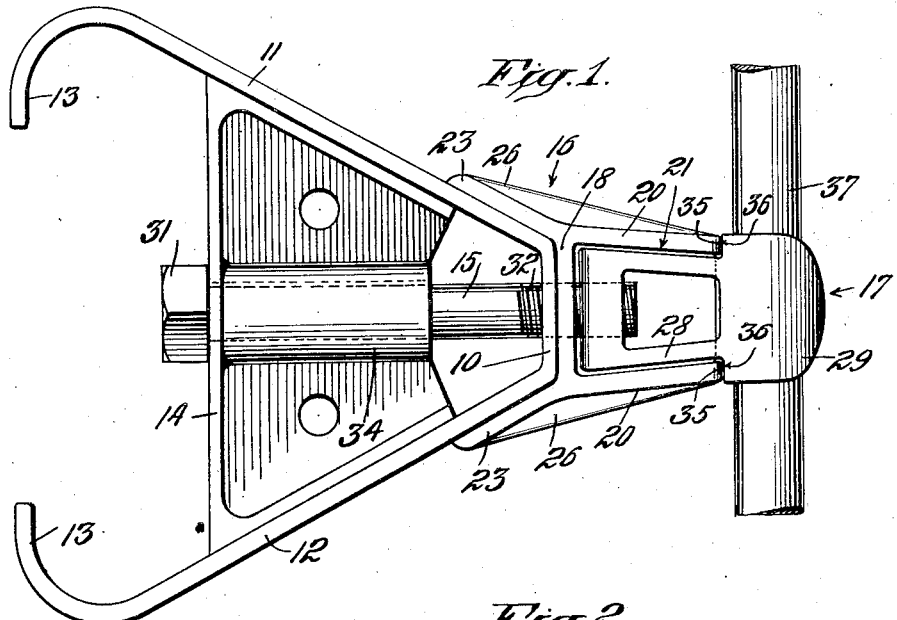
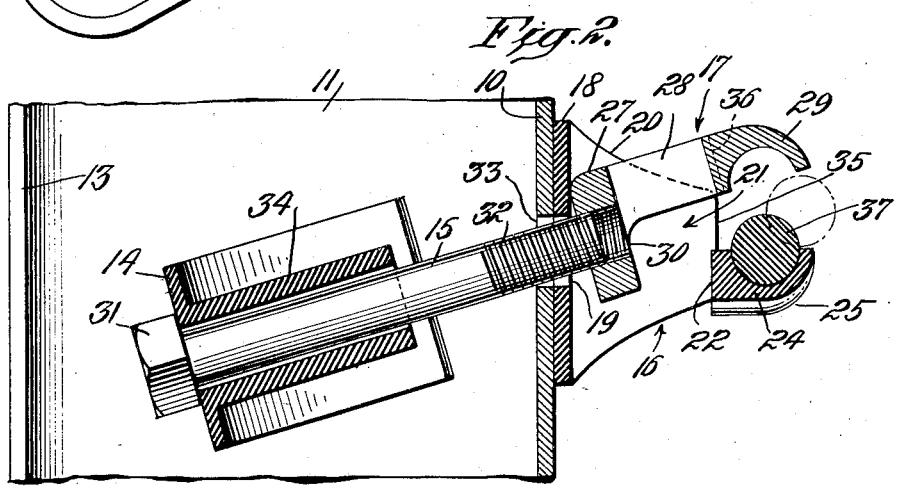
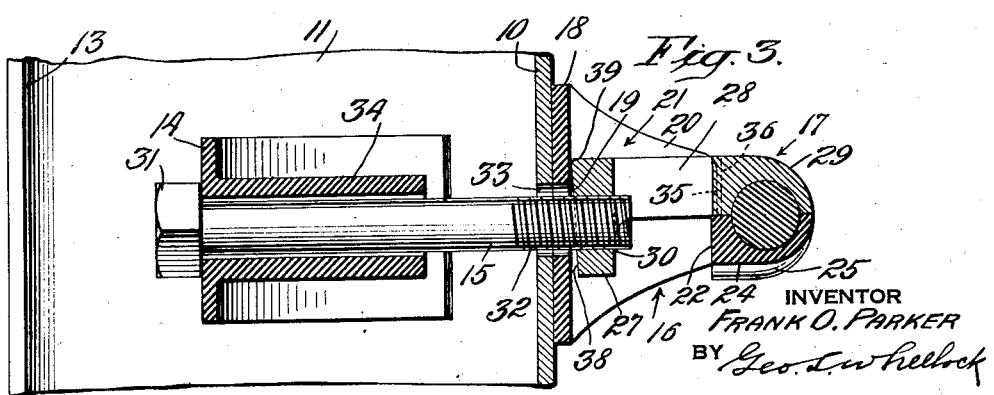
INVENTOR
FRANK O. PARKER
BY Geo. L. Wheelock
ATTORNEY Patented Jan. 15, 1935

1,988,136

UNITED STATES PATENT OFFICE 1,988,136

SUPPORTING BRACKET

Frank O. Parker, Buffalo, N. Y., assignor to Acme Steel & Malleable Iron Works, Inc., Buffalo, N. Y., a corporation of New York Application June 6, 1933, Serial No. 674,547

12 Claims. (Cl. 248—31)

The present invention relates to supporting brackets more particularly but not necessarily known as the type of brackets usually characterized as offset brackets, which offset brackets are on steel, concrete or wooden posts for highway guard rails. Heretofore offset brackets have comprised a large number of parts making the brackets expensive and uncertain in use and when composed of fewer parts, their manner of operation and assembly frequently requires the use of a special bolt in order to draw the clamping members of the bracket together.

One of the objects of the present invention in its preferred form is to provide an offset bracket in which the bolt which holds the bracket in position on the post is also attached to one of the clamping members of the bracket by means of a thread so as to eliminate the necessity of a separate nut, although as will appear herefrom, certain features of the invention may be used even in connection with a bolt and nut when the full advantages of the invention are not to be made use of.

Another object of the present invention is to provide the clamping or holding members of the bracket with means for resisting any blow received by the guard rail usually in the form of a cable, whereby the bracket is made strong and efficient in service.

Another object of the invention is preferably to construct the bracket of only three members, two of which are the clamping or holding members of the bracket and the other a bolt which does not require a nut, making it a very simple and easy matter to install the bracket on a post and not requiring, after the body of the bolt has been placed in the post and the cable strung, a separate operation to insert the movable clamping member of the bracket and a separate screw and nut, but which preferable construction simply requires a tightening up of the one and only bolt.

Other objects of the invention are to provide supporting brackets which may be mounted in position wherever desired and which may support some element to be supported and which bracket is thoroughly practical and is strong and efficient in service, and which includes a minimum number of parts.

These being among the objects of the present invention, the same consists of certain features of construction and combinations of parts to be hereinafter described and then claimed with reference to the accompanying drawing illustrating preferred embodiments of the invention and wherein Fig. 1 is a top plan of a supporting post and the improved bracket held in using position thereon for supporting a guard rail, for example;

Fig. 2 is a section of the post and the bracket, being perpendicular to Fig. 1, and showing the parts of the bracket in open position for receiving and holding a guard rail, for example, before the parts of the bracket are tightened up; and Fig. 3 is a section similar to Fig. 2, but illustrating a slight modification, wherein the parts of the bracket are shown as tightened up to retain a guard rail or other element.

Referring to Figs. 1 and 2 of the drawing the post for supporting the bracket comprises a front wall 10, side flanges 11, 12 diverging from the front wall 10 and inwardly deflected back portions 13 formed with the side flanges. This type of post is one which is frequently used along highways for supporting offset brackets and is made of sheet metal bent into the shape shown in plan by Fig. 1, there being a large recess formed within the post. In other words, this type of post is hollow, and although the invention is applicable to other forms of supports such as concrete or wooden posts, the special construction of bracket which preferably constitutes the principal form of the invention is well adapted for use in connection with such special posts, and therefore the invention is shown and will be described more particularly with reference to its applicability to such special type of posts.

For supporting the improved bracket upon such a type of post it is preferred to employ a bearing member 14 which is adapted to be positioned in the space or recess between the side flanges 11, 12 of the post. As the recess is tapered transversely of the post, the bearing member 14 is shaped correspondingly with the taper, so that such member is of wedge-shape. A bolt 15 passes through this member and is adapted to secure the improved bracket upon the outside of the post, in such way that all the parts will be rigidly mounted in position on the post when the bracket is in position for holding a guard rail or the like. The improved bracket comprises two members 16, 17, which may be formed of cast metal or other desired material. Preferably the member 16 is the main supporting member of the bracket and the member 17 is the upper member. Preferably also the member 16 is the larger of the two, and hence that member may be designated as the major member and the member 17 as the minor member.

Bracket member 16 comprises a base portion 18 provided with a perforation or hole 19 through which the bolt 15 is adapted to pass, and side flanges 20, one at each edge of the base 18, between which flanges 20 a longitudinal recess 21 is formed in front of the base or wall 18. A back portion 22, ordinarily located at the bottom of member 16 connects the side flanges 20, so that portions of the flanges project upwardly in the preferable position of bracket 16. The flanges 20 extend along the base or wall 18 from edge to edge thereof, and as portions of the flanges 20 extend away from the back-portion 22, this back portion may be considered as including those portions of the flanges 20 which are directly between the portion 22 and the lower portion of the base 18. In other words, the longitudinal recess 21 may be considered closed along the lower edges of the flanges 20, and be closed if desired, so as to impart additional strength.

The member 16 also preferably comprises divergent side flanges 23 extending rearwardly from the base or wall 18, and such member has a suitably recessed jaw or clip 24 formed with the back portion 22 and which projects in front of the side flanges 20. Preferably a reinforcing rib 25 is formed transversely of the back of jaw 24 and a longitudinal reinforcing rib 26 is formed upon each flange 20 and the adjacent flange 23.

Member 17 of the bracket preferably comprises a base portion 27, a back portion 28 and a suitably recessed jaw or clip 29 to oppose the jaw 24. As this member 17 is preferably smaller than the bracket member 16, it is received in the recess 21 of member 16, and the base 27 is provided with a screw-threaded hole 30. The back portion 28 of member 17 is preferably open for the sake of lightness and to avoid unnecessary material, and the back portion 28 also extends perpendicularly to the base 27, which base is arranged directly adjacent the base wall 18 of the member 16.

At its outer end bolt 15 is provided with a head 31 formed integral therewith and having flat faces enabling the bolt to be turned by a wrench. Bolt 15 is provided at its inner end with a long screw thread 32 which fits the screw thread of the hole 30 when the bolt is screwed into said hole. The threaded end 32 of the bolt passes through a hole 33 in the wall 10 of the post and through the hole 19 of member 16 and is screwed into the base of the member 17, when the parts are assembled on the post. Also the bolt 15 passes through a sleeve 34 formed with the wedge-shaped bearing member 14 and the head 31 of the bolt is adapted to make contact with such bearing member.

In assembling the parts comprising the bearing member 14, bolt 15 and the two clamping or holding members 16, 17 upon a post of the type shown in the drawing, the bolt is passed through the bearing member and they are placed within the post, and the threaded end of the bolt is passed through the holes 33 and 19, respectively, of the post and the base wall 18 of member 16, the two members 16, 17 being held upon the outside of the post so that a few turns of the thread of the bolt may be engaged with the thread of the base 27 of member 17, the said parts being assembled loosely together upon the post, with the side flanges 23 straddling the corresponding portion of the post. The parts are preferably assembled on the post in such way as to locate the member 16 at the bottom of the bracket and the member 17 at the top of the bracket, and as the parts are preferably not tightened up when they are originally assembled on the post, the weight of the bolt and the bearing member 14 will hold the jaws or clips 24 and 29 in open position as shown in Fig. 2, the bolt being inclined downwardly from the post and the member 17 inclined upwardly, with the base 27 of member 17 bearing against the base 18 of member 16. This gravitational open position is obtainable by virtue of the fact that the inner diameter of the sleeve 34 and the diameters of the holes 33 and 19 are made reasonably greater than the diameter of the bolt itself. Preferably the upper outer corners of the flanges 20 and the corner formed between the base 27 and the back portion 28 of member 17 are rounded off as shown in Fig. 2 to permit the member 17 to be tilted upwardly, so that the jaws or clips of the bracket members will be in open position. Preferably also the flanges 20 extend convergingly from the base 18 so as to provide a tapering longitudinal recess 21, the back portion 28 of member 17 being correspondingly tapered, but fitting loosely but not tightly in the recess 21. This allows of a slight play of the member 17 with respect to member 16 when the bolt is being tightened up, and prevents longitudinal separation of such members.

It is preferred to assemble the parts loosely upon the post, in the manner stated, because in erecting a cable, for example, the contractors prefer to place the brackets on the posts in such way as to enable them to receive the cable, and then to string the cable, after which the brackets are tightened up in some way. The present invention provides a bracket which is easy to install and requires less time to tighten the bracket up to hold the cable. It will be seen therefore that with the jaws or clips open as shown in Fig. 2 it is possible to string a cable in position and then by means of the fingers the bolt may be screwed in further with respect to the member 17. This action will draw the wedge-shaped bearing member 14 home against the post, and as the wedge is drawn home, the member 17 will be forced into horizontal position, like the position shown in Fig. 3, except that the base 27 is brought parallel with the base 18.

Preferably the forward edges of the flanges 20 provide outwardly facing shoulders 35 which extend perpendicularly with respect to the inner face of jaw 24, while the member 17 is laterally enlarged at both sides, as shown in Fig. 1, to provide inwardly facing shoulders 36 at opposite sides of the jaw 29. The shoulders 35 and 36 are caused to mutually bear the one on the other when the bolt 15 is finally tightened up to retain the element 37 to be supported, for example, a highway guard cable. If necessary a wrench may be applied to the head 31 of the bolt for a final tightening up, and as the back portion 28 of member 17 is slightly shorter than the recess 21, the tightening may be continued until the shoulders 36 bear squarely and firmly upon the shoulders 35, thereby rigidly holding the members 16, 17 together upon the cable or other element. If a blow is received by the cable 37, it is transmitted to the shoulders 35, 36, which resist the effect which otherwise might cause damage. It will be seen that to obtain the final effect of tightening up of the bolt that the faces of the shoulders 35, 36 extend in planes which are transverse of the bolt.

To obtain a pinching action of the movable member 17 upon member 16, the modification illustrated in Fig. 3 may be employed. In this modification parts corresponding with Figs. 1 and 2 bear the same reference numerals. In this modification, however, the shoulders 35, 36 are not intended to bear mutually upon each other when the bolt is finally tightened up, but as in Figs. 1 and 2 they assist in maintaining a proper assembly of the parts. In the modification the surface 38 of the member 17, which surface is contiguous to the base wall 18, is inclined from one side of member 17 to the opposite side, so as to provide a bearing area 39 for the base 27. The result of such modified construction is that when the bolt is finally tightened up, a slight tilt is imparted to the member 17, taking the bearing area 39 as a fulcrum Such action pinches the jaw or clip 29 upon the under jaw or clip 24.

If the improved bracket is used with a concrete post, the bearing member 14 is not employed. However, a longer bolt is used, and by inserting the bolt through a hole in the concrete post and then taking up just a few threads in the movable holding member and shoving the bolt and clip a little forward, there is enough space to insert the cable This is assisted by making the bolt hole somewhat larger than the diameter of the bolt, as then the main body 16 of the bracket may sag a little.

Other modifications of the present invention will be obvious to those skilled in the art and may be resorted to without departing from the spirit of the invention as embraced in the appended claims.

What I claim as new is—

1. In a supporting bracket, the combination of a major jaw-member and a minor jaw-member, the major member having a flat perforated transverse base at its inner end and a longitudinal recess to receive the minor member, the minor member having a perforated base opposite the base of the major member, the perforation of the base of the minor member being screw-threaded and the perforations adapted to register, and the members having opposed jaws at their outer ends the recess extending inwardly to the flat base, and the jaw of the minor member spaced at a substantial distance from the base of the minor member, and a bolt having its inner end screw-threaded and passing through the perforations and threaded into the threaded perforation for maintaining the jaws in position to receive an element between them.

2. In a supporting bracket, the combination of a major jaw-member and a minor jaw-member, the major member having a perforated base and a longitudinal recess to receive the minor member, the minor member having a perforated base opposite the base of the major member, the perforation of the base of the minor member being screw-threaded and the perforations adapted to register, and the members having opposed jaws at their outer ends, means on the major member for confining the minor member in the recess so as to restrict it to a limited outward movement in a direction parallel with the major member, and a bolt having its inner end screw-threaded and passing through the perforations and threaded into the threaded perforation for maintaining the jaws in position to receive an element between them.

3. In a supporting bracket, the combination of a major jaw-member and a minor jaw-member, the major member having a perforated base and a longitudinal recess to receive the minor member, the minor member having a perforated base opposite the base of the major member, the perforation of the base of the minor member being screw-threaded and the perforations adapted to register, and the members having opposed jaws at their outer ends, the opposite sides of the major member recess and of the minor member being substantially correspondingly tapered and gradually reduced in transverse dimensions towards the jaws, and a bolt having its inner end screw-threaded and passing through the perforations and threaded into the threaded perforation for maintaining the jaws in position to receive an element between them.

4. In a supporting bracket, the combination of a major jaw-member and a minor jaw-member, the major member having a flat perforated transverse base at its inner end and a longitudinal recess to receive the minor member, the minor member having a perforated base opposite the base of the major member, the perforation of the base of the minor member being screw-threaded and the perforations adapted to register, and the members having opposed jaws at their outer ends the recess extending inwardly up to the flat base, and the jaw of the minor member spaced at a substantial distance from the base of the minor member, the major member having at the outer end of the recess outwardly facing shoulders laterally of its jaw and at the inner end of its jaw, and the minor member having inwardly facing shoulders at the opposite sides of its jaw, and the shoulders of one member facing the shoulders of the other member, and a bolt having its inner end screw-threaded and passing through the perforations and threaded into the threaded perforation for maintaining the jaws in position to receive an element between them.

5. In a supporting bracket, the combination of a major jaw-member and a minor jaw-member, the major member having a perforated base and a longitudinal recess to receive the minor member, the minor member having a perforated base opposite the base of the major member, the perforation of the base of the minor member being screw-threaded and the perforations adapted to register, and the members having opposed jaws at their outer ends, and a bolt having its inner end screw-threaded and passing through the perforations and threaded into the threaded perforation for maintaining the jaws in position to receive an element between them, and the members having mutually facing portions adjacent the sides of the jaws and the faces of which extend in planes transverse of the perforations and the bolt.

6. In a supporting bracket, the combination of a major jaw-member and a minor jaw-member, the major member having a flat perforated transverse base at its inner end and a longitudinal recess to receive the minor member, the minor member having a perforated base opposite the base of the major member, the perforation of the base of the minor member being screw-threaded and the perforations adapted to register, and the members having opposed jaws at their outer ends the recess extending inwardly up to the flat base, and the jaw of the minor member spaced at a substantial distance from the base of the minor member, and a bolt having its inner end screw-threaded and passing through the perforations and threaded into the threaded perforation for maintaining the jaws in position to receive an element between them, and the members having mutually facing portions adjacent the jaws and the faces of which extend in planes transverse of the perforations and the bolt, the inner end of the minor member being slightly spaced from the inner transverse wall of the recess to permit the bolt to draw the mutually facing portions firmly together.

7. In a supporting bracket, the combination of a major jaw-member and a minor jaw-member, the major member having a perforated base and a longitudinal recess to receive the minor member, the minor member having a perforated base opposite the base of the major member, the perforation of the base of the minor member being screw-threaded and the perforations adapted to register, and the members having opposed jaws at their outer ends, and a bolt having its inner end screw-threaded and passing through the perforations and threaded into the threaded perforation for maintaining the jaws in position to receive an element between them, that surface of the base of the minor member which is opposite to the inner transverse wall of the recess being inclined toward the jaw of such member, whereby the minor member is adapted to slightly tilt and move its jaw toward the other jaw when the bolt is screwed in.

8. In a supporting bracket, the combination of a major member having a flat base at its inner end and a back portion extending outwardly from its base and side flanges extending from the back portion and the base and forming a longitudinally elongated recess, a minor member extending within the recess, between the flanges, and having a base opposed to the base of the major member, mutually facing jaws at the outer ends of the members and beyond the flanges, means for confining the minor member in the recess so as to restrict it to a limited outward movement in a direction parallel with the major member and to permit the minor member while still confined in the recess to be tilted outwardly relatively to the major member, and movable means engaging the bases of the members for assembling them rigidly together for causing the jaws to hold an element between them.

9. The combination with an upright support, of a bracket mounted on a side of the support, and including a lower member having a jaw for supporting an article and an upper member having a jaw opposed to aforesaid jaw, the support and members having holes for receiving a bolt, a bolt passing through the holes of the support and lower member and screw-threaded at its inner end into the hole of the upper member, and a head on the outer end of the bolt, the holes in the support and the lower member being sufficiently larger than the bolt to permit the bolt and the upper member to tilt and remain tilted with the jaws open, to receive the article and with the members of the bracket and bolt in assembled relation on the support, whereby when the jaws are in closed position and the bolt is screwed in by its head, until the head meets the resistance of the support, portions of the jaw members will mutually bear firmly together to retain the jaws on an article between them.

10. The combination with an upright support having a recess in one side, of a bracket mounted on the opposite side of the support, and including a lower member having a jaw for supporting an article and an upper member having a jaw opposed to aforesaid jaw, a bearing member located in the recess for engaging the support, the support and the three members having holes for receiving a bolt, a bolt passing through the holes and screw-threaded at its inner end into the hole of the upper member, and a head on the outer end of the bolt, the holes in the support and lower member being sufficiently larger than the bolt to permit the bolt and the upper member to tilt and remain tilted with the jaws open to receive the article and to be held tilted by the weight of the bolt and the bearing member, whereby, when the jaws are in closed position and the bolt is screwed home by its head portions of the jaw members will mutually bear firmly together and the bracket and the bearing member will be rigidly bound together upon opposite sides of the support.

11. The combination with an upright support having divergent flanges providing a recess in one side, of a bracket mounted on the opposite side of the support, and including a lower member having a jaw for supporting an article and an upper member having a jaw opposed to aforesaid jaw, a wedge-shaped bearing member located in the recess for engaging the flanges of the support, the support and the three members having holes for receiving a bolt, a bolt passing through the holes and screw-threaded at its inner end into the hole of the upper member, and a head on the outer end of the bolt, the holes in the support and lower member being sufficiently larger than the bolt to permit the bolt and the upper member to tilt and remain tilted with the jaws open to receive the article and to be held tilted by the weight of the bolt and the bearing member, whereby, when the jaws are in closed position and the bolt is screwed home by its head, portions of the jaw members will mutually bear firmly together and the bracket and the bearing member will be rigidly bound together upon opposite sides of the support.

12. The combination with a hollow upright support, of a bracket mounted on the face of the support, and including a lower member having a jaw for supporting an article, such as a cable, and an upper member having a jaw opposed to aforesaid jaw, the support and members having holes for receiving a bolt, a bolt passing through the holes of the support and both members, and means for tightening up the bolt, the holes in the support and the lower member being sufficiently larger than the bolt to permit the bolt and the upper member to tilt and remain tilted with the jaws open to receive the article, and with the two members of the bracket and the bolt in assembled relation on the support, whereby when the jaws are in closed position and the bolt is tightened up until it meets the resistance of the support, portions of the jaw members will mutually bear firmly together and the jaws be retained on an article between them.

FRANK O. PARKER.